(12) United States Patent
Moon et al.

(10) Patent No.: US 12,464,234 B2
(45) Date of Patent: Nov. 4, 2025

(54) ELECTRONIC DEVICE INCLUDING IMAGE SENSOR AND OPERATING METHOD THEREOF

(71) Applicant: Samsung Electronics Co., Ltd., Gyeonggi-do (KR)

(72) Inventors: Inah Moon, Gyeonggi-do (KR); Jaehyoung Park, Gyeonggi-do (KR); Shuichi Shimokawa, Gyeonggi-do (KR); Yeotak Youn, Gyeonggi-do (KR); Kawang Kang, Gyeonggi-do (KR); Dongsoo Kim, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 183 days.

(21) Appl. No.: 18/074,907

(22) Filed: Dec. 5, 2022

(65) Prior Publication Data

US 2023/0101860 A1 Mar. 30, 2023

Related U.S. Application Data

(63) Continuation of application No. PCT/KR2022/002018, filed on Feb. 10, 2022.

(30) Foreign Application Priority Data

Feb. 10, 2021 (KR) .................. 10-2021-0019463
Jun. 3, 2021 (KR) .................. 10-2021-0072286

(51) Int. Cl.
*H04N 23/67* (2023.01)
*H04N 23/10* (2023.01)
(Continued)

(52) U.S. Cl.
CPC .......... *H04N 23/672* (2023.01); *H04N 23/10* (2023.01); *H04N 23/12* (2023.01); *H04N 23/55* (2023.01); *H04N 25/772* (2023.01); *H04N 25/78* (2023.01)

(58) Field of Classification Search
CPC ...... H04N 23/672; H04N 23/12; H04N 23/55; H04N 25/772; H04N 23/10; H04N 23/667;
(Continued)

(56) References Cited

U.S. PATENT DOCUMENTS 9,288,382 B2   3/2016  Fujii et al.
10,056,421 B2  8/2018  Hatakeyama
(Continued)

FOREIGN PATENT DOCUMENTS

JP  2016-131346  7/2016
JP  2016-167886  9/2016
(Continued)

OTHER PUBLICATIONS

PCT/ISA/210 Search Report issued on PCT/KR2022/002018, May 30, 2022, pp. 5.
(Continued)

*Primary Examiner* — Albert H Cutler
(74) *Attorney, Agent, or Firm* — The Farrell Law Firm, P.C.

(57) ABSTRACT

A method and an electronic device are provided in which, in a first unit pixel of an image sensor, a first analog-to-digital conversion (ADC) is performed by reading out a first photodiode (PD) group and a second PD group that is adjacent to the first PD group in a first direction. A second ADC is performed by reading out a third PD group that is adjacent to the first PD group in a second direction. The second direction is perpendicular to the first direction. A
(Continued)

third ADC is performed by reading out a fourth PD group that is adjacent to the second PD group in the second direction. A first phase difference in the second direction is detected based on the first ADC, the second ADC, and the third ADC. A second phase difference in the first direction is detected based on the second ADC and the third ADC.

20 Claims, 13 Drawing Sheets

(51) Int. Cl.
  *H04N 23/12* (2023.01)
  *H04N 23/55* (2023.01)
  *H04N 25/772* (2023.01)
  *H04N 25/78* (2023.01)
(58) Field of Classification Search
  CPC .... H04N 25/704; H04N 25/778; H04N 25/78; H04N 25/40
  See application file for complete search history.

(56) References Cited

U.S. PATENT DOCUMENTS

| | | | |
|---|---|---|---|
| 10,484,627 | B2 | 11/2019 | Zhou |
| 10,630,929 | B2 | 4/2020 | Koizumi |
| 10,911,701 | B2 | 2/2021 | Hatakeyama |
| 11,778,333 | B2 | 10/2023 | Nagata |
| 2012/0194721 | A1 | 8/2012 | Sakalda |
| 2016/0044229 | A1 | 2/2016 | Hamada |
| 2018/0240823 | A1 | 8/2018 | Tochigi et al. |
| 2019/0020838 | A1* | 1/2019 | Hatakeyama ........ H04N 25/778 |
| 2019/0082130 | A1 | 3/2019 | Li et al. |
| 2020/0027914 | A1 | 1/2020 | Lee |
| 2020/0099876 | A1 | 3/2020 | Shimada et al. |
| 2020/0358989 | A1 | 11/2020 | Hoshino |
| 2020/0382728 | A1 | 12/2020 | Diasparra et al. |

FOREIGN PATENT DOCUMENTS

| | | |
|---|---|---|
| JP | 2017-069724 | 4/2017 |
| JP | 2018-011141 | 1/2018 |
| JP | 2018-113542 | 7/2018 |
| JP | 2019-200348 | 11/2019 |
| JP | 2020-061758 | 4/2020 |
| KR | 10-2015-0124367 | 11/2015 |
| KR | 10-2016-0016466 | 2/2016 |
| WO | WO 2019/050743 | 3/2019 |
| WO | WO 2020/170565 | 8/2020 |

OTHER PUBLICATIONS

PCT/ISA/237 Written Opinion issued on PCT/KR2022/002018, May 30, 2022, pp. 4.
European Search Report dated May 3, 2024 isssued in counterpart application No. 22752996.3-1207, 10 pages.
European Search Report dated Nov. 8, 2024 isssued in counterpart application No. 22752996.3-1207, 9 pages.

* cited by examiner

FIG.7

ELECTRONIC DEVICE INCLUDING IMAGE SENSOR AND OPERATING METHOD THEREOF

CROSS-REFERENCE TO RELATED APPLICATIONS

This application is a continuation of International Application No. PCT/KR2022/002018 designating the United States, filed in the Korean IP Receiving Office on Feb. 10, 2022, and based on and claims priority under 35 U.S.C. § 119(a) to Korean Application Nos. 10-2021-0019463 and 10-2021-0072286, filed in the Korean IP Office on Feb. 10, 2021 and Jun. 3, 2021, respectively, the content of which is incorporated herein by reference

FIELD

The disclosure relates to an electronic device with an image sensor, and more particularly, to technology for performing an autofocusing function in an electronic device including an image sensor.

BACKGROUND

With the requirement of high-resolution modes, technology has been developed for improving focus performance by using image sensors. Image sensors have been developed that reduce the resulting pixel size and to increase the resulting pixel number, due to restrictions on camera mounting structures. Methods for reducing the pixel size have been proposed in line with such trends. In particular, pixel structures capable of phase difference detection have been developed based on recent demands for image sensors having a high focus performance, instead of simply high-pixel modes.

Meanwhile, according to state-of-the art auto focus (AF) methods, two photodiodes (PDs) having 2×1 pixel structures are disposed below a single microlens, and are classified with regard to left-side data and right-side data, thereby performing an autofocusing function such that a focus is made with reference to the phase difference between the two. However, there are increasing demands for structures capable of having high resolutions along with the decreasing PD size, and it has been proposed to use four PDs having 2×2 pixel structures, instead of 2×1 structures, so as to share a single microlens. Such an approach has been required in recent image sensors because, in addition to the advantage of high resolutions, phase differences between left and right and between up and down can be obtained.

SUMMARY

In the case of a 4PD structure in which four PDs are shared through one floating diffusion (FD) node, each of the four PDs needs to be read out once, and already-read PD values cannot be redundantly read out again.

In order to overcome such limitations, the number of analog-to-digital conversions (ADCs) is increased such that each disparity is detected by using data regarding left, right, up, and down. In such a case, the frame rate may be affected, thereby making fast image data transmission difficult.

However, if the phase difference in only one direction (for example, left and right or up and down) is used, in order to prevent such frame rate loss, the accuracy may be lower than in the case of using phase differences between left, right, up, and down.

According to an aspect, an electronic device is provided that includes an image sensor having a plurality of unit pixels. Each unit pixel includes at least four PDs. The PDs are disposed adjacent to each other in a first direction and a second direction that is different from the first direction. The electronic device also includes at least one processor electrically connected to the image sensor. The at least one processor is configured to perform, in a first unit pixel among the plurality of unit pixels, a first ADC by reading out a first PD group included in the first unit pixel and a second PD group in the first unit pixel that is adjacent to the first PD group in the first direction. The at least one processor is also configured to perform a second ADC by reading out a third PD group in the first unit pixel that is adjacent to the first PD group in the first unit pixel in the second direction, and perform a third ADC by reading out a fourth PD group in the first unit pixel that is adjacent to the second PD group in the first unit pixel in the second direction. The at least one processor is further configured to detect a first phase difference in the second direction based on a result of the first ADC, the second ADC, and the third ADC, and detect a second phase difference in the first direction based on a result of the second ADC and the third ADC.

According to an aspect, a method is provided for operating an electronic device. In a first unit pixel among a plurality of unit pixels included in an image sensor of the electronic device, a first ADC is performed by reading out a first PD group included in the first unit pixel and a second PD group in the first unit pixel that is adjacent to the first PD group in a first direction. A second ADC is performed by reading out a third PD group in the first unit pixel that is adjacent to the first PD group in the first unit pixel in a second direction. The second direction is perpendicular to the first direction. A third ADC is performed by reading out a fourth PD group in the first unit pixel that is adjacent to the second PD group in the first unit pixel in the second direction. A first phase difference in the second direction is detected based on a result of the first ADC, the second ADC, and the third ADC. A second phase difference in the first direction is detected based on a result of the second ADC and the third ADC.

An electronic device and a method described herein may reduce frame rate loss while securing phase differences in multiple directions, thereby improving the AF performance.

Advantageous effects obtainable from the disclosure are not limited to the above-described effects, and other advantageous effects not mentioned herein will be clearly understood from the following description by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating performing of an ADC in an electronic device according to various embodiments;

DETAILED DESCRIPTION

Figure 1:
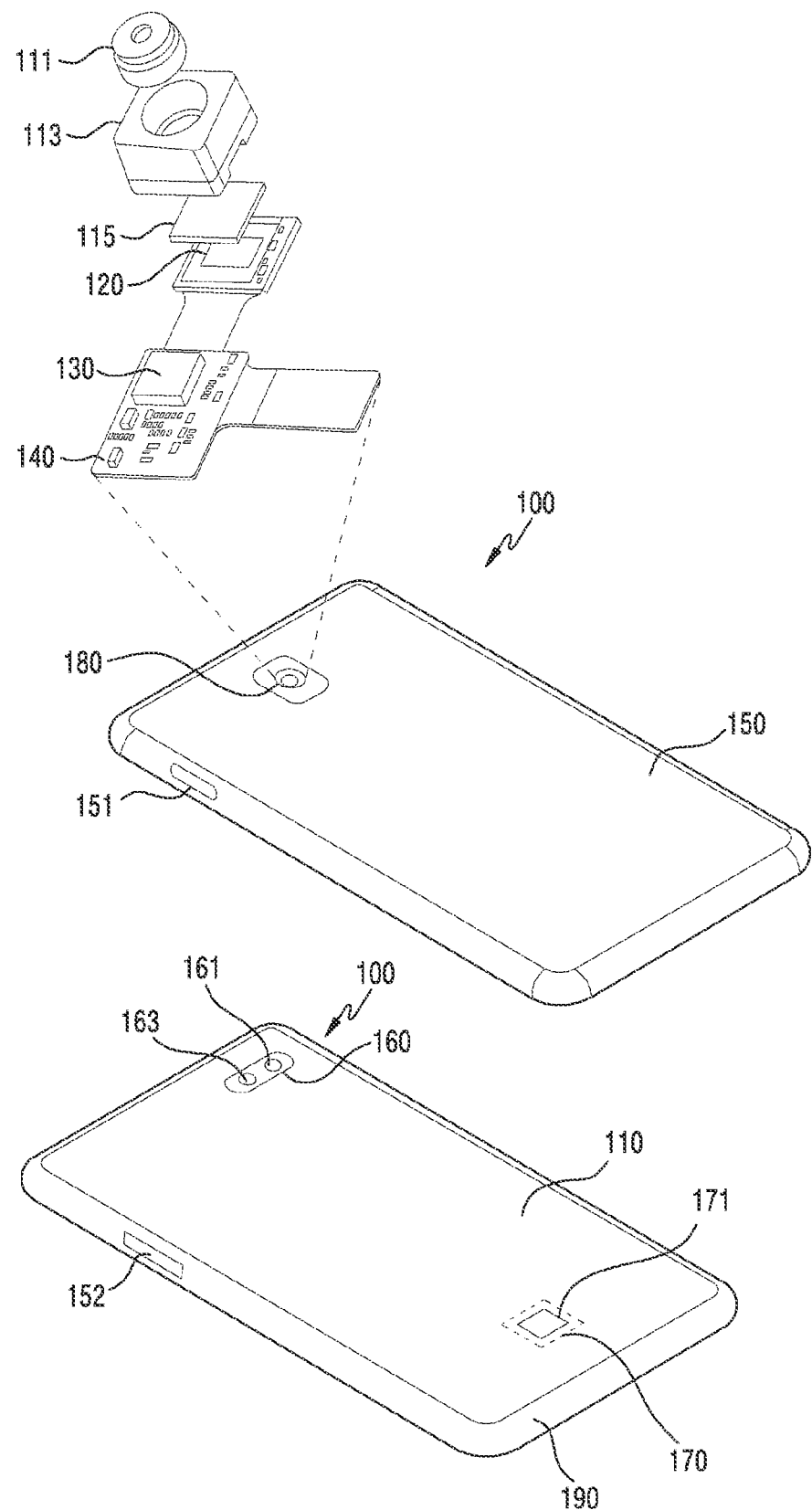
FIG. 1 is a diagram illustrating a camera module and an electronic device, according to an embodiment.

FIG. 1 is a diagram illustrating the structure of a camera module and an electronic device, according to an embodiment.

FIG. 1 schematically illustrates a camera module 180, and the exterior of an electronic device 100 having the camera module 180 mounted thereto. The embodiment of FIG. 1 is illustrated and described using a mobile device, such as, for example, a smartphone, but those skilled in the art will understand that the embodiment may be applied to any electronic device having a camera mounted thereto, among various electronic devices or mobile devices.

Referring to FIG. 1, a display 110 may be disposed on the front surface of the electronic device 100. The display 110 may occupy most of the front surface of the electronic device 100. The display 110 and a bezel 190 area, which at least partially surrounds the edge of the display 110 may be disposed on the front surface of the electronic device 100. The display 110 may include a flat area and a curved area extending from the flat area toward the side surface of the electronic device 100. The display 110 of the electronic device 100 may include only a flat area without a curved area, or may include a curved area at only one edge, but not both edges. Further, the curved area may extend to the rear surface of the electronic device 100, and thus, the electronic device 100 may include an additional flat area.

The electronic device 100 may also include a speaker, a receiver, a front camera 161, a proximity sensor, and a home key. The electronic device 100 may be provided with a rear cover 150 while being integrated with the body of the electronic device. The rear cover 150 may have a shape in which the same is detached from the body of the electronic device 100 so as to allow a battery to be replaced. The rear cover 150 may be referred to as a battery cover or a rear surface cover.

A fingerprint sensor 171 for recognizing a user's fingerprint may be disposed in a first region 170 of the display 110. The fingerprint sensor 171 may be disposed on a layer below the display 110, and thus, may not be viewed by a user. Alternatively, the fingerprint sensor 171 may be disposed such that it is difficult to view the same. Further, an additional sensor for user/biometric authentication in addition to the fingerprint sensor 171 may be disposed in a partial region of the display 110. In another embodiment, the sensor for user/biometric authentication may be disposed in one region of the bezel 190. For example, an infrared (IR) sensor for iris authentication may be disposed so as to be exposed through one region of the display 110 or exposed through one region of the bezel 190.

The front camera 161 is disposed in a second region 160 on the front surface of the electronic device 100. The front camera 161 is exposed through one region of the display 110. However, the front camera 161 may also be exposed through the bezel 190. The display 110 may include, in the rear surface of the second region 160, at least one of an audio module, a sensor module (e.g., a sensor 163), a camera module (e.g., the front camera 161), and a light-emitting element. For example, the camera module may be disposed in the front surface and/or the side surface of the electronic device 100 so as to face the front surface and/or the side surface. The front camera 161 may be an under-display camera (UDC), which is not visually exposed through the second region 160.

The electronic device 100 includes at least one front camera 161. For example, the electronic device 100 may have two front cameras, including a first front camera and a second front camera. The first front camera and the second front camera may be the same type of cameras having equal specifications (e.g., pixels). However, in another embodiment, the first front camera and the second front camera may be implemented as different cameras having different specifications. The electronic device 100 may support functions (e.g., 3D image-capturing, AF, etc.) related to a dual camera through two front cameras. The description of the front camera may be equally or similarly adopted to a rear camera of the electronic device 100.

The electronic device 100 may further includes the sensor 163 or various types of hardware for assisting image-capturing, such as a flash. For example, the electronic device 100 may include a distance sensor (e.g., a time of flight (TOF) sensor) for sensing the distance between a subject and the electronic device 100. The distance sensor may be disposed to be separate from the front camera 161 and/or the rear camera, or may be disposed to be included in the front camera 161 and/or the rear camera.

At least one physical key may be disposed on the side portion of the electronic device 100. For example, a first function key 151 for turning on/off the display 110 or turning on/off a power source of the electronic device 100 may be disposed at a right edge with reference to the front surface of the electronic device 100. A second function key 152 for controlling the volume of electronic device 100 or controlling screen brightness may be disposed at a left edge with reference to the front surface of the electronic device 100. In addition, an additional button or key may also be disposed on the front surface or the rear surface of the electronic device 100. For example, a physical button or touch button, mapped to a specific function, may be disposed in the lower-end region of the bezel 190 of the front surface.

The electronic device 100 of FIG. 1 corresponds to one example, and the example does not limit the type of a device to which the technical spirit of the disclosure is applied. For example, the technical spirit of the disclosure may be applied to a foldable electronic device which can be folded in the transverse or longitudinal direction or a rollable electronic device which can be rolled, by employing a flexible display or a hinge structure, or a tablet or notebook PC.

The electronic device 100 includes the camera module 180. The camera module 180 may include a lens assembly 111, a housing 113, an IR cut filter 115, an image sensor 120, and an image signal processor (ISP) 130.

In the lens assembly 111, the number, the arrangement, the types, etc., of lenses may vary depending on the front camera 161 and the rear camera. The front camera 161 and the rear camera may have different characteristics (e.g., a focal length, a maximum magnification ratio) based on the type of the lens assembly 111. The lens may move forward or backward along an optical axis, and may operate such that a clear image of a target object, which becomes a subject, can be captured by changing a focal length.

The camera module 180 may include a barrel for at least one lens aligned on the optical axis, and the housing 113 for mounting a magnet and/or at least one coil surrounding the circumference of the barrel about the optical axis. The camera module 180 may use the at least one coil and/or the magnet, included in the housing 113, to perform a stabilization function (e.g., optical image stabilization (OIS)) of an image acquired by the image sensor 120. For example, the camera module 180 may control, under control of a processor, the direction and/or intensity of an electric current passing through the at least one coil to control electromagnetic force, and may use Lorentz force by the electromagnetic force to move (or rotate) the lens assembly 111 and at least a portion of a lens carrier including the lens assembly 111 in a direction substantially perpendicular to the optical axis.

The camera module 180 may use another method for an image stabilization function. For example, the camera module 180 may use digital stabilization (video digital image stabilization (VDIS)). The camera module 180 may include a method for software-processing a data output value of the image sensor 120 to perform image stabilization. For example, the camera module 180 may extract a motion vector on the basis of the difference (different image) of frames of a video through the VDIS, and may increase sharpness through image processing. Further, the camera module 180 may extract a motion vector based on a video through the VDIS to recognize, as shakes, the motion of a subject itself in addition to shaking of the electronic device 100.

The IR cut filter 115 may be disposed on the top surface of the image sensor 120. An image of a subject, having passed through the lens, may be partially filtered by the IR cut filter 115 and then sensed by the image sensor 120.

The image sensor 120 may be disposed on a top surface of a printed circuit board (PCB) 140, a printed board assembly (PBA), a flexible PCB (FPCB), or a rigid-flexible PCB (RFPCB)). The image sensor 120 may be electrically connected, by a connector, to the ISP 130 connected to the PCB 140. An FPCB or a cable may be used as the connector.

The image sensor 120 may be a complementary metal oxide semiconductor (CMOS) sensor. A plurality of individual pixels are integrated in the image sensor 120, and each of the individual pixels may include a micro lens, a color filter, and a PD. Each of the individual pixels is a type of photodetector, and may convert input light into an electrical signal. The photodetector may include PDs. For example, the image sensor 120 may amplify, through the lens assembly 111, an electric current that received light has generated through the photoelectric effect of a light-receiving element. For example, each of the individual pixels may include a photoelectric transformation element or a light sensing element (position sensitive detector (PSD)), and multiple transistors.

Optical information of the subject, incident through the lens assembly 111, may be converted into an electrical signal by the image sensor 120, and input into the ISP 130.

When the ISP 130 and the image sensor 120 are physically separate from each other, a sensor interface based on an appropriate standard may electrically connect the image sensor 120 to the ISP 130.

The ISP 130 may image-process electrically converted image data. The process in the ISP 130 may be divided into a pre-ISP (hereinafter, "pre-processing") and an ISP chain (hereinafter, "post-processing"). Image processing before a demosaicing process may refer to pre-processing, and image processing after the demosaicing process may refer to post-processing. The pre-processing process may include 3A processing, lens shading correction, edge enhancement, dead pixel correction, and knee correction. The 3A may include at least one of auto white balance (AWB), auto exposure (AE), and AF. The post-processing process may include at least one among a sensor index change, a tuning parameter change, and screen ratio adjustment. The post-processing process may include a process of processing image data output from the image sensor 120 or image data output from a scaler. The ISP 130 may adjust, through the post-processing process, at least one among the contrast, sharpness, saturation, and dithering of an image. The procedure of adjusting contrast, sharpness, or saturation may be performed in a YUV color space, and the dithering procedure may be performed in a red, green, and blue (GRB) color space. A part of the pre-processing process may be performed in the post-processing process, or a part of the post-processing process may be performed in the pre-processing process. Further a part of the pre-processing process may be repeated as a part of the post-processing process.

The camera module 180 may be disposed on the front surface and the rear surface of the electronic device 100. Further, in order to improve the performance of a camera, the electronic device 100 may include not only one camera module 180 but may also include multiple camera modules 180. For example, the electronic device 100 may further include the front camera 161 for video call or self-camera shooting. The front camera 161 may support a relatively small number of pixels compared with the rear camera module. The front camera 161 may be relatively small compared with the camera module 180 of the rear camera.

Figure 2:
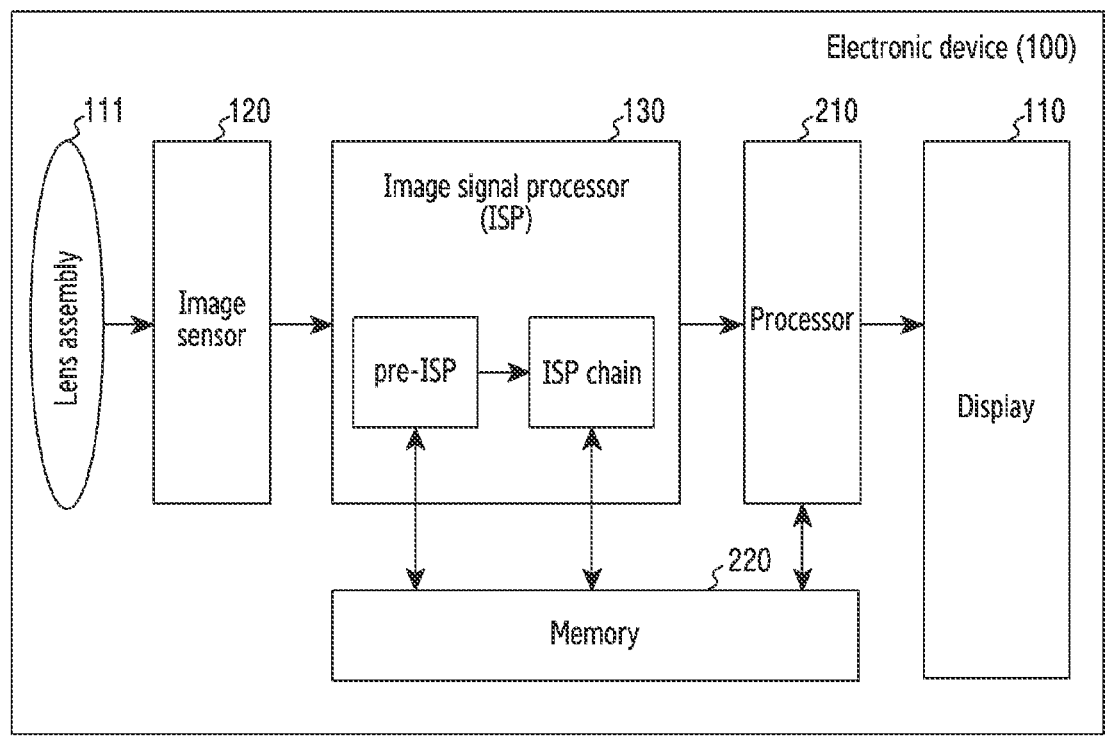
FIG. 2 is a diagram illustrating main hardware elements of an electronic device, according to an embodiment.

FIG. 2 is a diagram illustrating main hardware elements of an electronic device, according to an embodiment. In describing FIG. 2, elements described above with reference to FIG. 1 may be briefly described, or a description thereof may be omitted.

Referring to FIG. 2, the electronic device 100 includes the lens assembly 111, the image sensor 120, the ISP 130, a processor 210, the display 110, and a memory 220.

In the lens assembly 111, the quantity, the arrangement, the types, etc., of lenses may vary depending on a front camera and a rear camera. The front camera and the rear camera may have different characteristics (e.g., a focal length, a maximum magnification ratio, etc.) based on the type of the lens assembly.

When the ISP 130 is physically separate from the image sensor 120, there may be a sensor interface based on a standard.

The ISP 130 may image-process electrically converted image data. The process in the ISP 130 may be divided into a pre-ISP (hereinafter, "pre-processing") and an ISP chain (hereinafter, "post-processing"). Image processing before a demosaicing process may refer to pre-processing, and image processing after the demosaicing process may refer to post-processing. The pre-processing process may include 3A processing, lens shading correction, edge enhancement, dead pixel correction, and knee correction. The 3A may include at least one of AWB, AE, and AF. The post-processing process may include at least one of a sensor index change, a tuning parameter change, and screen ratio adjustment. The post-processing process may include a process of processing image data output from the image sensor 120 or image data output from a scaler. The ISP 130 may adjust, through the post-processing process, the contrast, sharpness, saturation, dithering, or the like of an image. The procedure of adjusting contrast, sharpness, or saturation may be performed in a YUV color space, and the dithering procedure may be performed in a red, green, and blue (GRB) color space. The ISP 130 may transmit, to the memory 220 (e.g., a display buffer), image data obtained after performing the post-processing process. The display 110 may display, under control of the processor 210, the image data stored in the memory 220 on a display screen.

The processor 210 may perform/control various functions supported by the electronic device 100. For example, the processor 210 may execute a code, written in a programing language and stored in the memory 220, to execute an application and control various types of hardware. For example, the processor 210 may execute an application that supports a shooting function and is stored in the memory 220. Further, the processor 210 may execute a camera module (e.g., the camera module 180 of FIG. 1), and may configure and support an appropriate shooting mode such that the camera module 180 can perform an operation desired by a user.

The memory 220 may store instructions that can be executed by the processor 210. The memory 220 may be understood as a concept including an element, such as random access memory (RAM), in which data is temporarily stored, and/or an element, such as a solid state drive (SSD), in which data is permanently stored. For example, the processor 210 may call instructions stored in the SSD to implement a software module in a RAM space. Various types of memory may be included, and the appropriate type thereof may be adopted according to the use of a device.

An application associated with the camera module 180 may be stored in the memory 220. For example, a camera application may be stored in the memory 220. The camera application may support various shooting functions such as, for example, photographing, moving-image shooting, panoramic photography, and slow motion recording.

The processor 210 may display, on the display 110, an execution screen of an application executed by the processor 210, or contents such as image and/or moving-images stored in the memory 220. Further, the processor 210 may display image data, acquired through the camera module 180, on the display 110 in real time.

Figure 3:
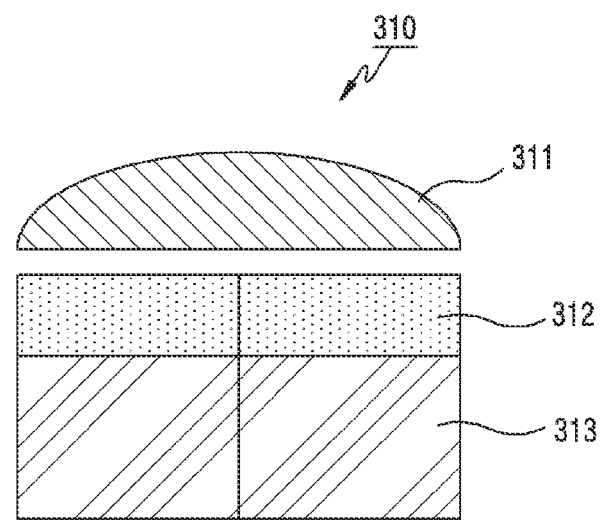
FIG. 3 is a diagram illustrating a cross-sectional view of a pixel array of an image sensor, according to an embodiment.
Figure 3:
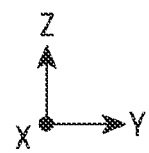

FIG. 3 is a diagram illustrating a cross-sectional view of a pixel array of an image sensor, according to an embodiment.

Referring to FIG. 3, the image sensor 120 may include multiple unit pixels 310. Each of the unit pixels 310 may include at least four PDs 313. The multiple unit pixels 310 may be positioned on a plane perpendicular to the Z-axis corresponding to a direction in which light is incident. A first direction (e.g. an X-axis direction) of the multiple unit pixels 310 may be perpendicular to a second direction (e.g. the Y-axis direction) of the unit pixels 310. The first direction (e.g. the X-axis direction) and the second direction (e.g. the Y-axis direction) may be perpendicular to the Z-axis direction.

Each of the unit pixels 310 may include a microlens 311, a color filter 312, and the multiple PDs 313, or a combination thereof. Each of the multiple PDs 313 may also be referred to as a light-receiving element. The multiple PDs 313 may also be referred to as a multi-PD.

The microlens 311 may focus light incident on the microlens 311. The microlens 311 may adjust the path of light incident on the microlens 311 such that the light reaches each of the multiple PDs 313.

The color filter 312 may allow light having a predesignated color (or color channel) to pass therethrough. The color filter 312 of each of the multiple PDs 313 may allow light, which has one color (e.g., red) of predesignated colors (e.g., red, blue, or green) to pass therethrough according to a predesignated pattern (e.g., a Bayer pattern). The color filter 312 may block light having a color other than the predesignated color (or color channel).

The number of the multiple PDs 313 may be greater than or equal to 4. Each of the multiple PDs 313 may output a value corresponding to the incident light. Each of the multiple PDs 313 may output, based on the photoelectric effect, the value corresponding to the incident light. Each of the multiple PDs 313 may output, based on the photoelectric effect, a value corresponding to the intensity (or illuminance) of incident light.

Each of the multiple PDs 313 may generate, based on the photoelectric effect, an electric charge based on the intensity (or illuminance) of incident light. Each of the multiple PDs 313 may output a current based on the amount of generated electric charge.

Figure 4:
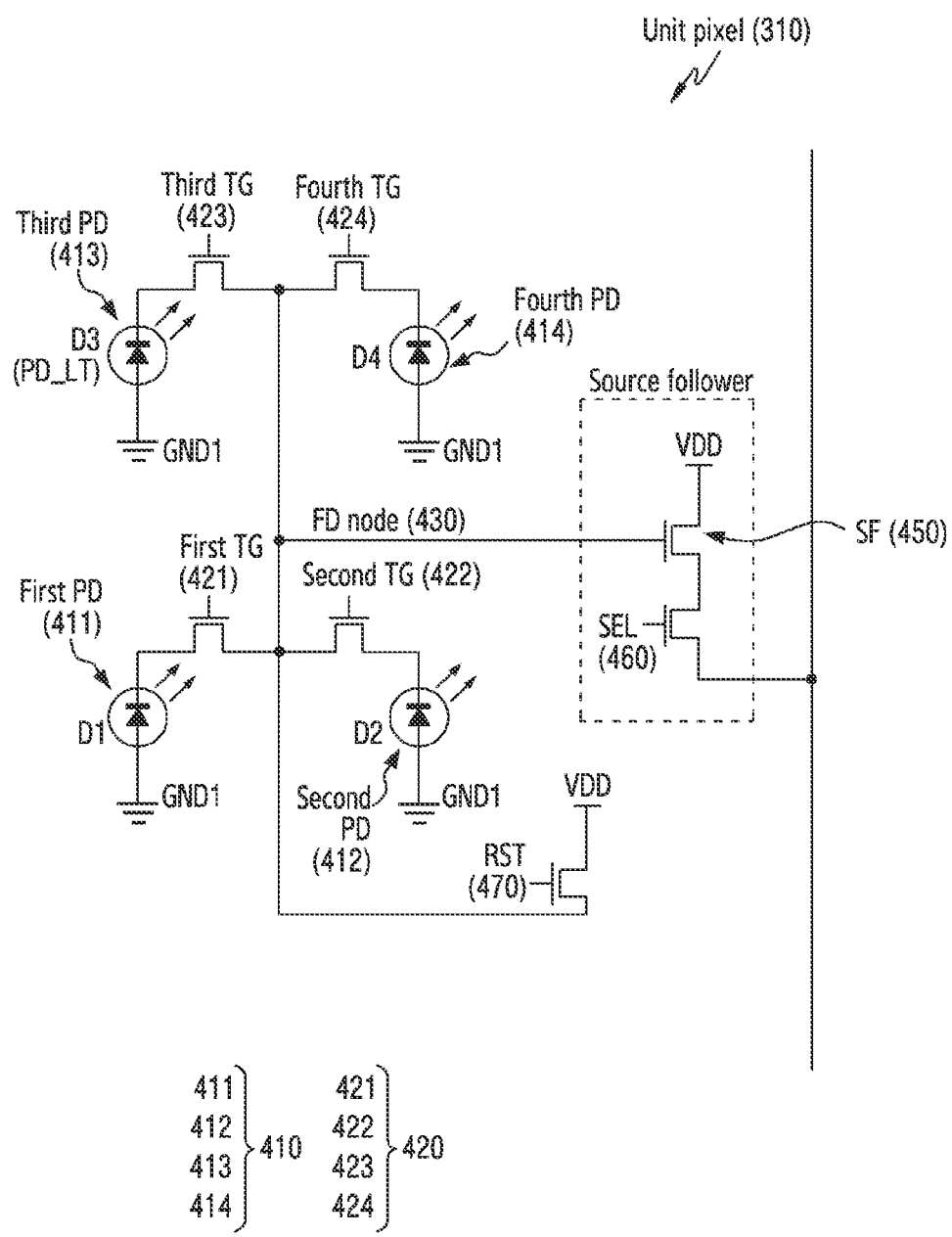
FIG. 4 is a diagram illustrating a circuit view of a unit pixel of an image sensor, according to an embodiment.

FIG. 4 is a diagram illustrating a circuit view of a unit pixel of an image sensor, according to an embodiment.

The unit pixel 310 may include multiple PDs 410, transfer gates (TGs) 420 corresponding to the PDs 410, an FD node 430, a source follower (SF) 450, a row select (hereinafter, "SEL") 460, and a reset gate (RST) 470.

The unit pixel 310 includes four PDs 410 (e.g., a first PD 411, a second PD 412, a third PD 413, and a fourth PD 414) having a 2×2 array and the at least one FD node 430 connected to the four PDs 410. For example, the unit pixel 310 may imply a microlens unit or a color filter unit. Herein, a description has been made based on the unit pixel 310 including four PDs 410 having a 2×2 array. However, this is one example, and various embodiments, which can be implemented by those skilled in the art, are possible.

Electric charges accumulated in the PDs 410 for an exposure time, may move to the FD node 430 while the TGs 420 are turned on. For example, an electric charge accumulated in the first PD 411 may move to the FD node 430 while a first TG 421 is turned on. The image sensor 120 may acquire analog data corresponding to the electric charge moved to the FD node 430. For example, the analog data may include information about the amount of electric charges accumulated in the PDs 410 for the exposure time.

The image sensor 120 may acquire analog data through the unit pixel 310. For example, the image sensor 120 may control the TGs 420 to acquire analog data corresponding to light amount data acquired through at least one of the PDs 410. For example, the image sensor 120 may acquire light amount data through the first PD 411, the second PD 412, the third PD 413, and the fourth PD 414 for the exposure time. When the image sensor 120 turns on the first TG 421, the image sensor 120 may acquire analog data based on light amount data acquired through the first PD 411. When the image sensor 120 turns on the first TG 421, a second TG 422, a third TG 423, and a fourth TG 424, the image sensor 120 may acquire analog data based on the light amount data acquired through the first PD 411, the second PD 412, the third PD 413, and the fourth PD 414.

The image sensor 120 may acquire analog data based on light amount data acquired through one of the four PDs 410. In another embodiment, the image sensor 120 may also acquire analog data based on light amount data acquired through at least two PDs of the four PDs 410. For example, it may also be understood that the image sensor 120 acquires analog data through the unit pixel 310.

An electric charge stored in the FD node 430 may be read out through the SF 450 and may be output as an electrical signal. The image sensor 120 may digitally convert the analog data through an ADC to acquire digital data. For example, it may be understood that the digital data may imply image data.

The image sensor 120 may switch the SEL 460 from an off-state to an on-state in order to output image data of a specific row.

The image sensor 120 may perform a correlated double sampling (CDS) operation in order to reduce noise. For example, the image sensor 120 may turn on the RST 470 to reset data accumulated in the FD node 430, and may read out reset data remaining after the resetting. The image sensor 120 may turn off the RST 470 and then move an electric charge accumulated in the PDs 410 to the FD node 430, and may read out the electric charge moved to the FD node 430 to acquire readout data.

Figure 5:
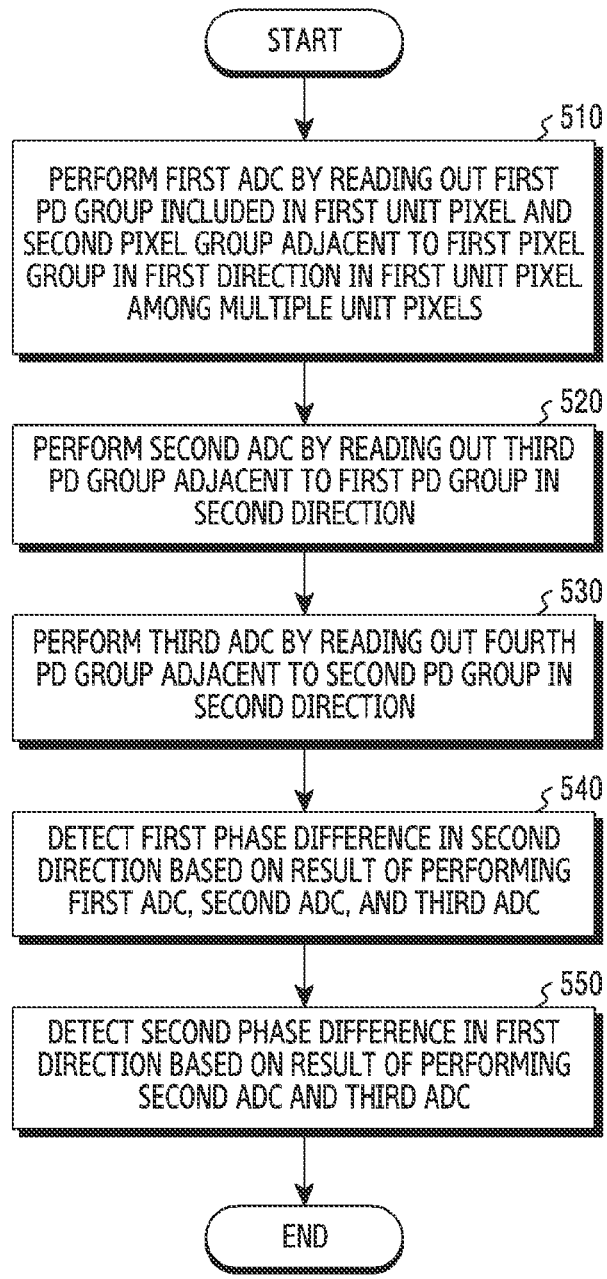
FIG. 5 is a flowchart illustrating operations performed by a processor for AF in an electronic device, according to an embodiment.

FIG. 5 is a flowchart illustrating operations performed by a processor for AF in an electronic device, according to an embodiment.

Referring to FIG. 5, at 510, the processor 210 performs, in a first unit pixel among multiple unit pixels, a first ADC by reading out a first PD group included in the first unit pixel and a second PD group adjacent to the first PD group in a first direction (e.g., the vertical direction).

Among the multiple unit pixels included in the image sensor 120, the first PD group may be placed in a first position, and the second PD group may be disposed adjacent to the first PD group in the first direction, which is a vertical direction downward from the first PD group. The processor 210 may convert analog data, acquired through multiple PDs included in the first PD group and the second PD group, to digital data.

At 520, the processor 210 may perform a second ADC by reading out a third PD group adjacent to the first PD group in a second direction. Among the multiple unit pixels included in the image sensor 120, the first PD group may be disposed in the first position, and the third PD group may be disposed adjacent to the first PD group in the second direction, which is a horizontal direction rightward from the first PD group. The processor 210 may convert analog data, acquired through multiple PDs included in the third PD group, to digital data.

At 530, the processor 210 may perform a third ADC by reading out a fourth PD group adjacent to the second PD group in the second direction. Among the multiple unit pixels included in the image sensor 120, the fourth PD group may be disposed adjacent to the second PD group in the second direction which is a horizontal direction rightward from the second PD group. The processor 210 may convert analog data, acquired through multiple PDs included in the fourth PD group, to digital data.

At 540, the processor 210 may detect a first phase difference in the second direction (e.g., the horizontal direction) based on the result of performing the first ADC, the second ADC, and the third ADC. The processor 210 may detect the phase difference in the second direction by using first ADC data acquired by reading out the first PD group and the second PD group adjacent to the first PD group in the first direction, second ADC data acquired by reading out the third PD group adjacent to the first PD group in the second direction (e.g., the horizontal direction), and third ADC data acquired by reading out the fourth PD group adjacent to the second PD group in the second direction.

At 550, the processor 210 may detect a second phase difference in the first direction (e.g., the vertical direction) based on the result of performing the second ADC and the third ADC. The phase difference in the first direction may be detected by using the second ADC data acquired by reading out the third PD group adjacent to the first PD group in the second direction, and by using the third ADC data acquired by reading out the fourth PD group adjacent to the second PD group in the second direction.

The processor 210 may perform an AF function based on the first phase difference and the second phase difference. When it is determined that there is the first phase difference in the first direction and/or the second phase difference in the second direction, the processor 210 may perform the AF function based on the first phase difference and the second phase difference. The processor 210 may acquire, based on the first phase difference and/or the second phase difference, information about the position of a focus, the direction of a focus, or the distance between a subject and the image sensor 120. The processor 210 may output, based on the first phase difference and/or the second phase difference, a control signal for moving the position of a lens.

Figure 6A:
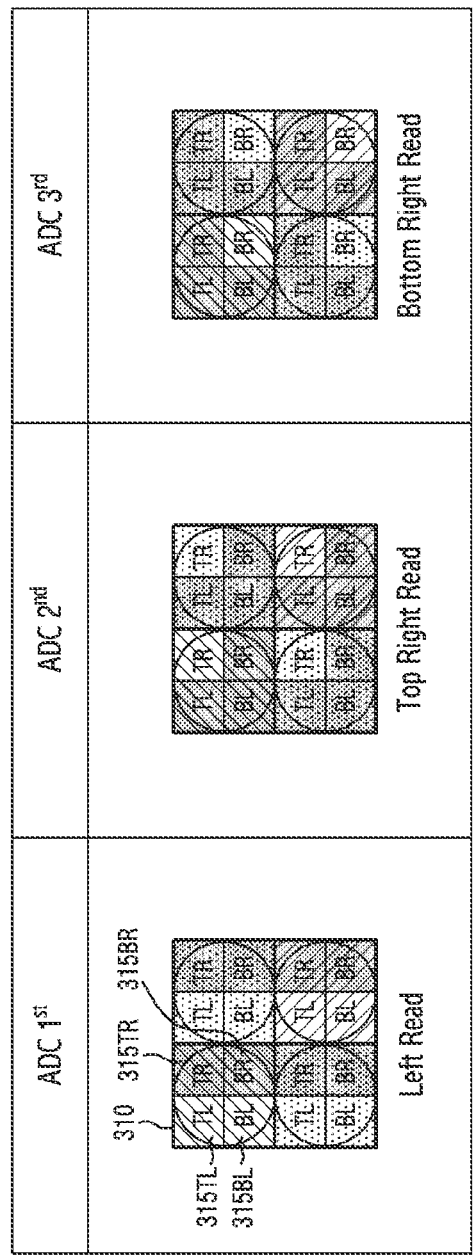
FIG. 6A is a diagram illustrating performing of an ADC when an image sensor includes a unit pixel including four PDs with a 2×2 array in an electronic device, according to an embodiment.
Figure 6B:
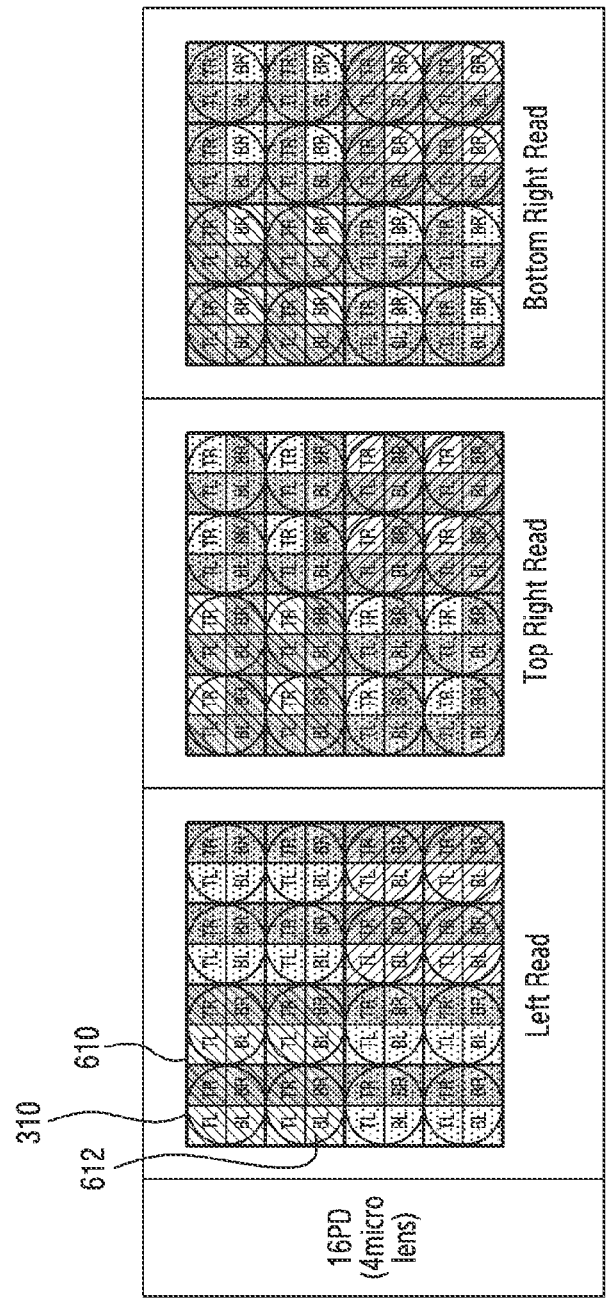
FIG. 6B is a diagram illustrating performing of an ADC when 16 PDs of an image sensor, having a 4×4 array, share the same color filter in an electronic device, according to an embodiment.

FIG. 6A is a diagram illustrating performance of an ADC when an image sensor includes a unit pixel including four PDs having a 2×2 array in an electronic device, according to an embodiment. FIG. 6B is a diagram illustrating an ADC when 16 PDs of an image sensor, having a 4×4 array, share the same color filter in an electronic device, according to an embodiment.

Referring to FIG. 6A, the image sensor 120 may acquire analog data through the unit pixels 310. For example, the image sensor 120 may acquire analog data through a first PD 315TL, a second PD 315BL, a third PD 315TR, and a fourth PD 315BR included in the unit pixel 310. The image sensor 120 may acquire the analog data based on light amount data acquired through at least one PD among the first PD 315TL, the second PD 315BL, the third PD 315TR, and the fourth PD 315BR, which are included in the unit pixel 310 and have a 2×2 array.

In the unit pixel 310, the processor 210 may perform a first ADC by reading out the first PD 315TL and the second PD 315BL adjacent to the first PD 315TL in a first direction (e.g., the vertical direction). The processor 210 may perform a second ADC by reading out the third PD 315TR adjacent to the first PD 315TL in a second direction (e.g., the horizontal direction). The processor 210 may perform a third ADC by reading out the fourth PD 315BR adjacent to the second PD 315BL in the second direction. When there are multiple unit pixels, operations of performing the first ADC, the second ADC, and the third ADC may be applied to all of the unit pixels.

Referring to FIG. 6B, the image sensor 120 may acquire analog data through a unit pixel 310. For example, the image sensor 120 may acquire the analog data through PDs 612 which are included in four unit pixels 310 and share an identical color filter 610. The image sensor 120 may acquire the analog data based on light amount data acquired through at least one PD among 16 PDs 612 included in the four unit pixels 310.

In the PDs 612 sharing one color filter 610, the processor 210 may perform a first ADC by reading out a first PD group and a second PD group adjacent to the first PD group in a first direction (e.g., the vertical direction). The processor 210 may perform a second ADC by reading out the third PD group adjacent to the first PD group in a second direction (e.g., the horizontal direction). The processor 210 may perform a third ADC by reading out a fourth PD group adjacent to the second PD group in the second direction. When there are multiple unit pixels, operations of performing the first ADC, the second ADC, and the third ADC may be applied to all of the unit pixels.

Figure 7:
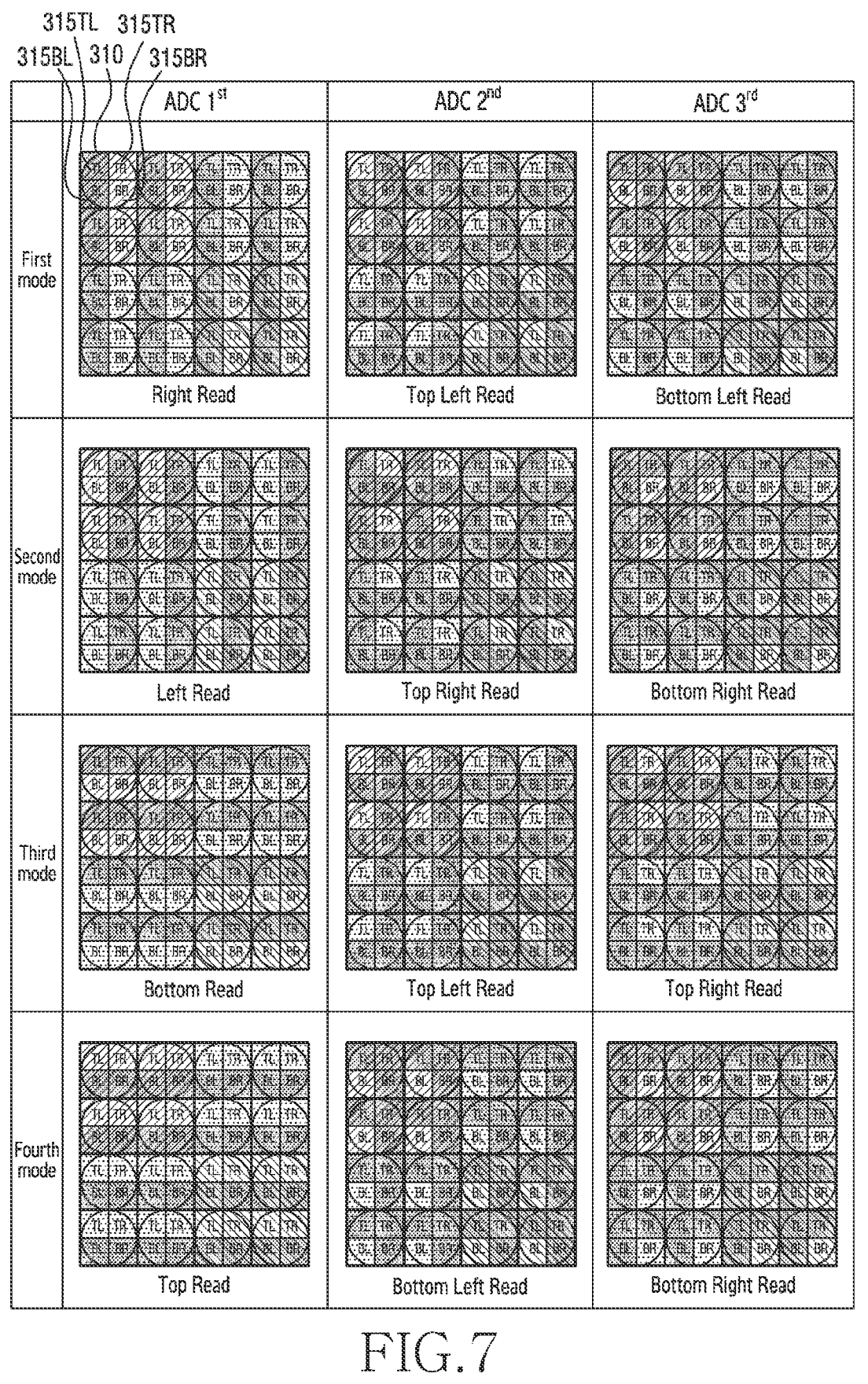

FIG. 7 is a diagram illustrating performance of an ADC in an electronic device, according to an embodiment.

Referring to FIG. 7, the image sensor 120 of the electronic device 100 includes multiple unit pixels 310. Four unit pixels 310 may share an identical color filter (e.g., the color filter 610 in FIG. 6B). Each unit pixel 310 may include at least four PDs. The unit pixel 310 includes the first PD 315TL, the second PD 315BL adjacent to the first PD 315TL in a first direction (e.g., the vertical direction), the third PD 315TR adjacent to the first PD 315TL in a second direction (e.g., the horizontal direction), and the fourth PD 315BR adjacent to the second PD 315BL in the second direction.

The processor 210 may determine the order of reading out the first PD 315TL, the second PD 315BL, the third PD 315TR, and the fourth PD 315BR included in the unit pixel 310. The processor 210 may read out the PDs included in the unit pixel 310 in one mode among a first mode, a second mode, a third mode, and a fourth mode according to the order.

In the first mode, the processor 210 may perform a first ADC by reading out the third PD 315TR and the fourth PD 315BR, may perform a second ADC by reading out the first PD 315TL, and may perform a third ADC by reading out the second PD 315BL.

In the second mode, the processor 210 may perform the first ADC by reading out the first PD 315TL and the second PD 315BL, may perform the second ADC by reading out the third PD 315TR, and may perform the third ADC by reading out the fourth PD 315BR.

In the third mode, the processor 210 may perform the first ADC by reading out the second PD 315BL and the fourth PD 315BR, may perform the second ADC by reading out the first PD 315TL, and may perform the third ADC by reading out the third PD 315TR.

In the fourth mode, the processor 210 may perform the first ADC by reading out the first PD 315TL and the third PD 315TR, may perform the second ADC by reading out the second PD 315BL, and may perform the third ADC by reading out the fourth PD 315BR.

Figure 8:
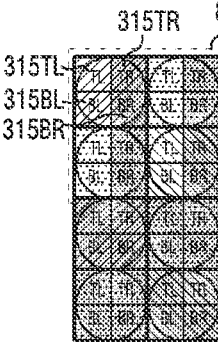
FIG. 8 is a diagram illustrating reading out of pixels in different orders with respect to different unit pixel groups in an electronic device, according to an embodiment.

FIG. 8 is a diagram illustrating the reading out of pixels in different orders with respect to different unit pixel groups in an electronic device, according to an embodiment.

Referring to FIG. 8, in the electronic device 100, the image sensor 120 may include multiple unit pixels. In PDs included in a first unit pixel 810 among the multiple unit pixels, a first ADC may be performed by reading out the first PD group 315TL of the first unit pixel 810 and the second PD group 315BL of the first unit pixel 810, which is adjacent to the first PD group 315TL of the first unit pixel 810 in a first direction (e.g., the vertical direction). A second ADC may be performed by reading out the third PD group 315TR of the first unit pixel 810, which is adjacent to the first PD group 315TL of the first unit pixel 810 in a second direction (e.g., the horizontal direction). A third ADC may be performed by reading out the fourth PD group 315BR of the first unit pixel 810, which is adjacent to the second PD group 315BL of the first unit pixel 810 in the second direction (e.g., the horizontal direction).

In PDs included in a second unit pixel 820 among the multiple unit pixels, a fourth ADC may be performed by reading a first PD group 325TL of the second unit pixel 820 and a third PD group 325TR of the second unit pixel 820, which is adjacent to the first PD group 325TL of the second unit pixel 820 in the second direction. A fifth ADC may be performed by reading out a second PD group 325BL of the second unit pixel 820, which is adjacent to the first PD group 325TL of the second unit pixel 820 in the first direction. A sixth ADC may be performed by reading out a fourth PD group 325BR of the second unit pixel 820, which is adjacent to the second PD group 325BL of the second unit pixel 820 in the second direction.

In the first unit pixel 810, the processor 210 may detect a first phase difference in the second direction based on the result of performing the first ADC, the second ADC, and the third ADC, and may detect a second phase difference in the first direction based on the result of performing the second ADC and the third ADC.

In the second unit pixel 820, the processor 210 may detect a third phase difference in the first direction based on the result of performing the fourth ADC, the fifth ADC, and the sixth ADC, and may detect a fourth phase difference in the second direction on the basis of the result of performing the fifth ADC and the sixth ADC.

The processor 210 may perform an AF function based on the first phase difference, the second phase difference, the third phase difference, and the fourth phase difference.

Figure 9:
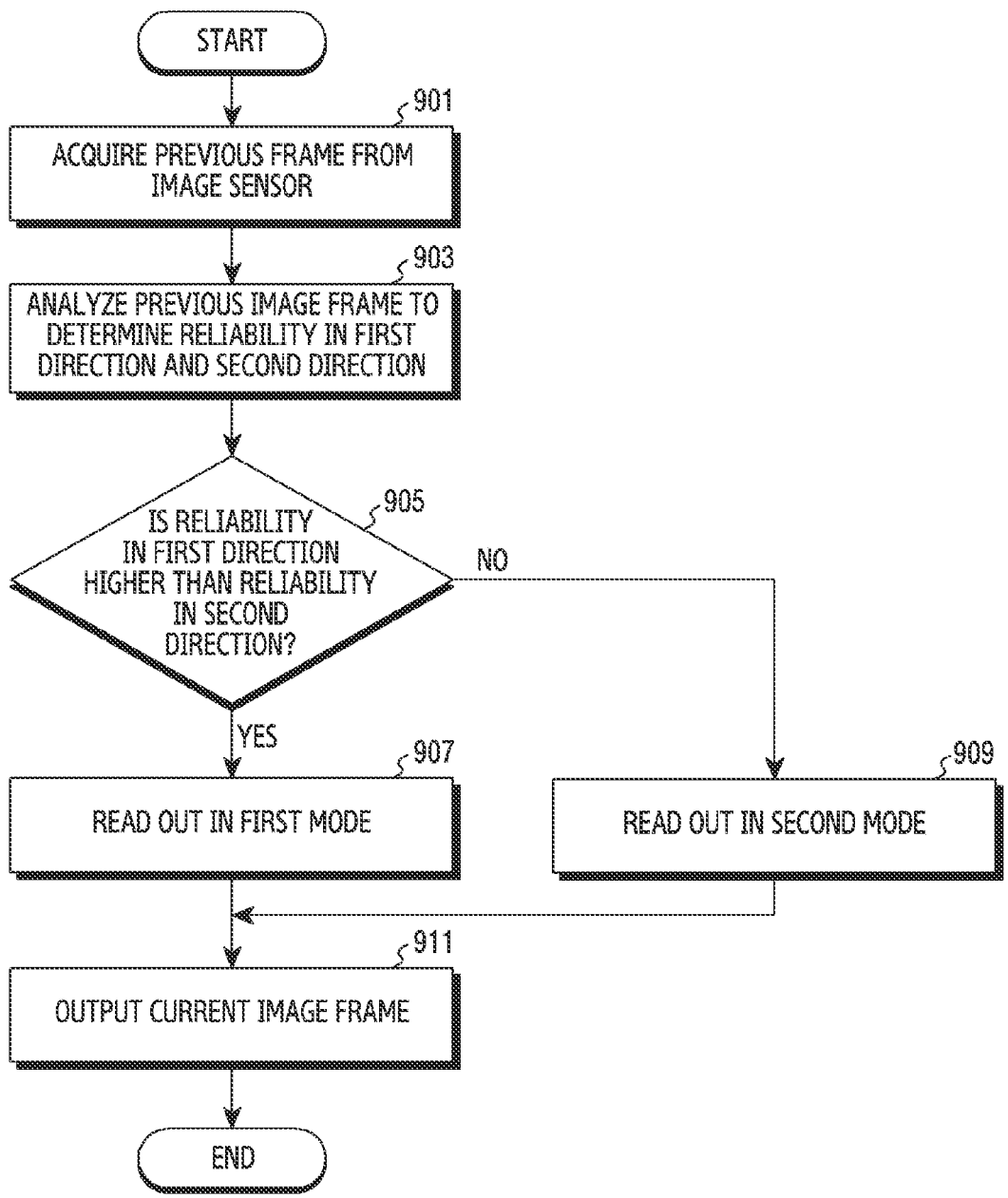
FIG. 9 is a flowchart illustrating determining an ADC mode by comparing reliability in a first direction and reliability in a second direction in an electronic device, according to an embodiment.

FIG. 9 is a flowchart illustrating a method for determining an ADC mode by comparing reliability in a first direction and reliability in a second direction in an electronic device, according to an embodiment. In describing FIG. 9, content that is repeated or is similar to the above-described content may be briefly described or may be omitted herein.

Referring to FIG. 9, at 901, the processor 210 may acquire a previous frame from the image sensor 120. The processor 210 may receive a frame previously acquired by the image sensor 120.

At 903, the processor 210 may analyze a previous image frame to determine reliability in a first direction and a second direction. The processor 210 may analyze the frame previously acquired by the image sensor 120 to determine the reliability in the first direction (e.g., the vertical direction) and the second direction (e.g., the horizontal direction). The processor 210 may determine reliability in the first direction and reliability in the second direction based on contrast information in the first direction and contrast information in the second direction, respectively. The processor 210 may determine, based on the contrast information, that the larger contrast is, the higher the reliability is.

At 905, the processor 210 may determine whether the reliability in the first direction is higher than the reliability in the second direction. The processor 210 may compare the reliability in the first direction with the reliability in the second direction on the basis of the contrast information in the first direction and the contrast information in the second direction.

When it is determined that the reliability in the first direction is higher than the reliability in the second direction, the processor 210 may perform readout in a first mode, at 907. When it is determined that the contrast in the first direction (e.g., the vertical direction) is larger than the contrast in the second direction (e.g., the horizontal direction), the processor 210 may perform readout in the first mode. For example, the first mode may include a mode in which the processor 210 performs a first ADC by reading out a first PD group and a third PD group adjacent to the first PD group in the second direction, performs a second ADC by reading out a second PD group adjacent to the first PD group in the first direction, performs a third ADC by reading out a fourth PD group adjacent to the second PD group in the second direction, detects a phase difference in the first direction on the basis of the result of performing the first ADC, the second ADC, and the third ADC, and detects a phase difference in the second direction on the basis of the result of performing the second ADC and the third ADC.

When it is not determined that the reliability in the first direction is higher than the reliability in the second direction, the processor 210 may perform readout in a second mode, at 909. When it is determined that the contrast in the first direction is smaller than the contrast in the second direction, the processor 210 may perform readout in the second mode. For example, the second mode may include a mode in which the processor 210 may perform the first ADC by reading out the first PD group and the second PD group adjacent to the first PD group in the first direction, perform the second ADC by reading out the third PD group adjacent to the first PD group in the second direction, performs the third ADC by reading out the fourth PD group adjacent to the second PD group in the second direction, detects the phase difference in the second direction on the basis of the result of performing the first ADC, the second ADC, and the third ADC, and detects the phase difference in the first direction on the basis of the result of performing the second ADC and the third ADC.

At 911, the processor 210 may output a current image frame. The processor 210 may output the current image frame based on the result of performing readout in the first mode or the second mode.

Figure 10:
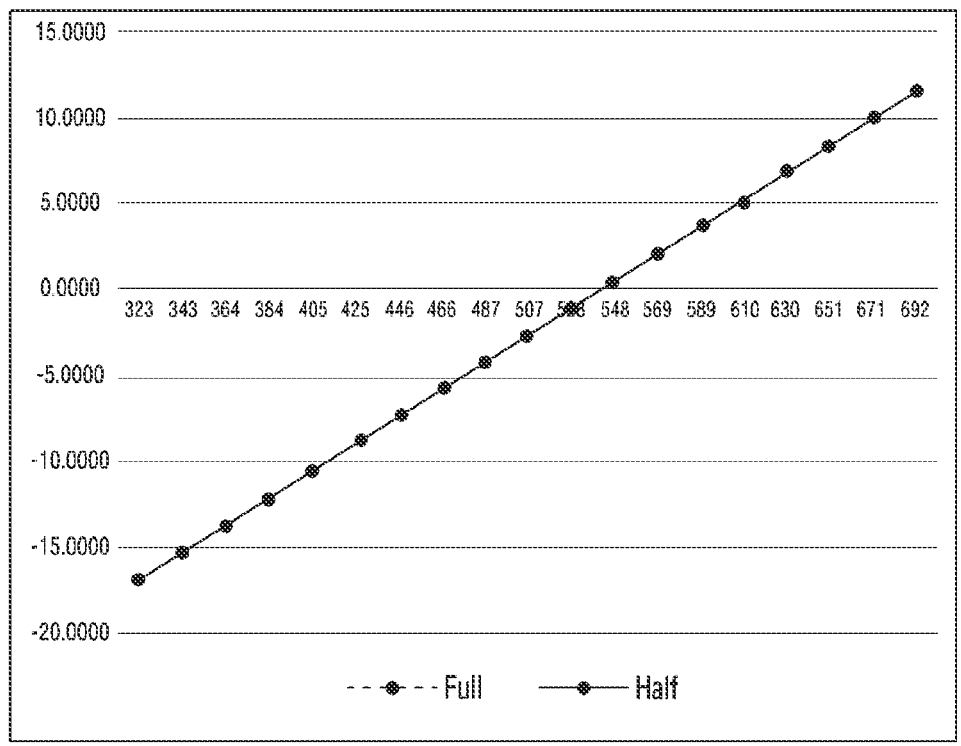
FIG. 10 is a graph illustrating disparity based on the position of an actuator in an electronic device, according to an embodiment.
Figure 10:
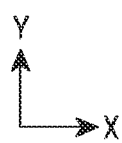

FIG. 10 is a graph illustrating disparity based on the position of an actuator in an electronic device, according to an embodiment.

Referring to FIG. 10, the X-axis indicates the position of an actuator, and the Y-axis indicates disparity based on the position of the actuator.

The ISP 130 may store image data (RDATA) in the memory 220, and may use position information (COOR) of phase detection pixels to extract phase detection pixel data from the image data (RDATA) stored in the memory 220. The ISP 130 may calculate disparity for each phase detection pixel from the phase detection pixel data.

FIG. 10 illustrates an embodiment showing disparity based on the position of an actuator in a case in which a phase difference is detected by using PDs included in a unit pixel of the image processor 210, when the ISP 130 has adjusted a focal position by using the actuator with reference to a first direction (e.g., the vertical direction) or a second direction (e.g., the horizontal direction) in a specific environment (e.g., indoor environment). For example, FIG. 10 is an embodiment showing disparity based on the position of an actuator when the phase difference is detected by using all (full) of the PDs included in the unit pixel and when the phase difference is detected by using half of the PDs included in the unit pixel. The disparity when the ISP 130 detects the phase difference by using all (full) of the PDs included in the unit pixel may be the same as the disparity when the ISP 130 detects the phase difference by using half of the PDs included in the unit pixel, or the difference therebetween may be smaller than a threshold value. There may be no great AF performance difference between when left, right, up, and down phase differences are detected by performing ADC three times and when left, right, up, and down phase differences are detected by performing ADC four times.

Figure 11:
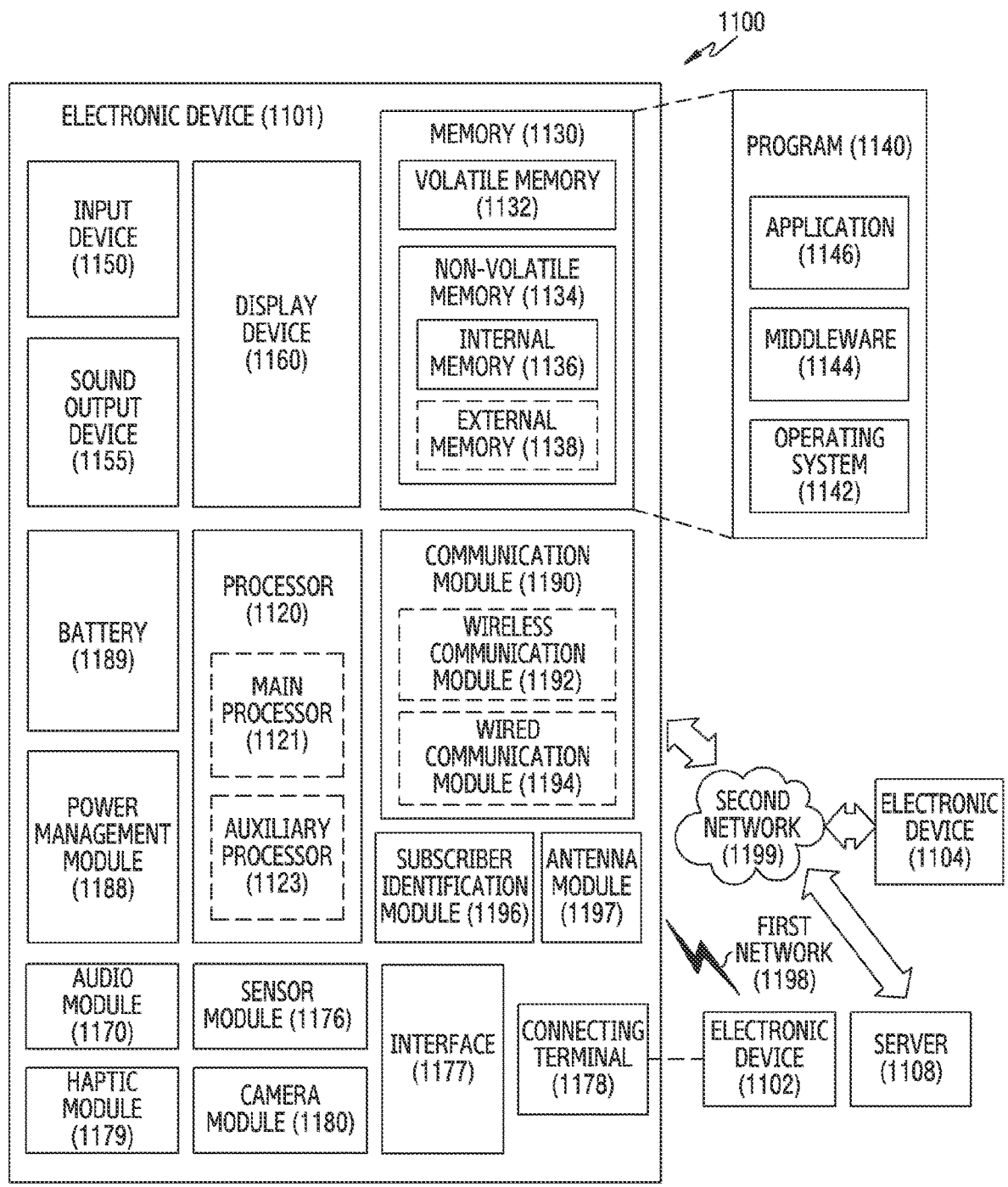
FIG. 11 is block diagram of an electronic device in a network environment, according to an embodiment.

FIG. 11 is a block diagram illustrating an electronic device (e.g. the electronic device 100 of FIG. 1) in a network environment, according to various embodiments. Referring to FIG. 11, an electronic device 1101 in a network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). The electronic device 1101 may communicate with the electronic device 1104 via the server 1108. The electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. At least one of the components (e.g., the connecting terminal 1178) may be omitted from the electronic device 1101, or one or more other components may be added in the electronic device 1101. Some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. As at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. The processor 1120 may include a main processor 1121 (e.g., a central processing unit (CPU) or an application processor (AP)), or an auxiliary processor 1123 (e.g., a graphics processing unit (GPU), a neural processing unit (NPU), an ISP (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). The auxiliary processor 1123 (e.g., an ISP or a CP) may be implemented as part of another component (e.g., the camera module 1180 or the communication module 1190) functionally related to the auxiliary processor 1123. The auxiliary processor 1123 (e.g., the NPU) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. The receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. The display module 1160 may include a touch sensor adapted to detect a touch, or a pressure sensor adapted to measure the intensity of force incurred by the touch.

The audio module 1170 may convert a sound into an electrical signal and vice versa. The audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. The interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). The connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. The haptic module 1179 may include, for example, a motor, a piezoelectric element, or an electric stimulator.

The camera module 1180 may capture a still image or moving images. The camera module 1180 may include one or more lenses, image sensors, ISPs, or flashes.

The power management module 1188 may manage power supplied to the electronic device 1101. The power management module 1188 may be implemented as at least part of, for example, a power management integrated circuit (PMIC).

The battery 1189 may supply power to at least one component of the electronic device 1101. The battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more CPs that are operable independently from the processor 1120 (e.g., the AP) and supports a direct (e.g., wired) communication or a wireless communication. The communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or IR data association (IrDA)) or the second network 1199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. The antenna module 1197 may include an antenna including a radiating element composed of a conductive material or a conductive pattern formed in or on a substrate (e.g., a PCB). The antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. Another component (e.g., a radio frequency integrated circuit (RFIC)) other than the radiating element may be additionally formed as part of the antenna module 1197.

The antenna module 1197 may form a mmWave antenna module. The mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or MEC. In another embodiment, the external electronic device 1104 may include an Internet-of-things (IoT) device. The server 1108 may be an intelligent server using machine learning and/or a neural network. The external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 12:
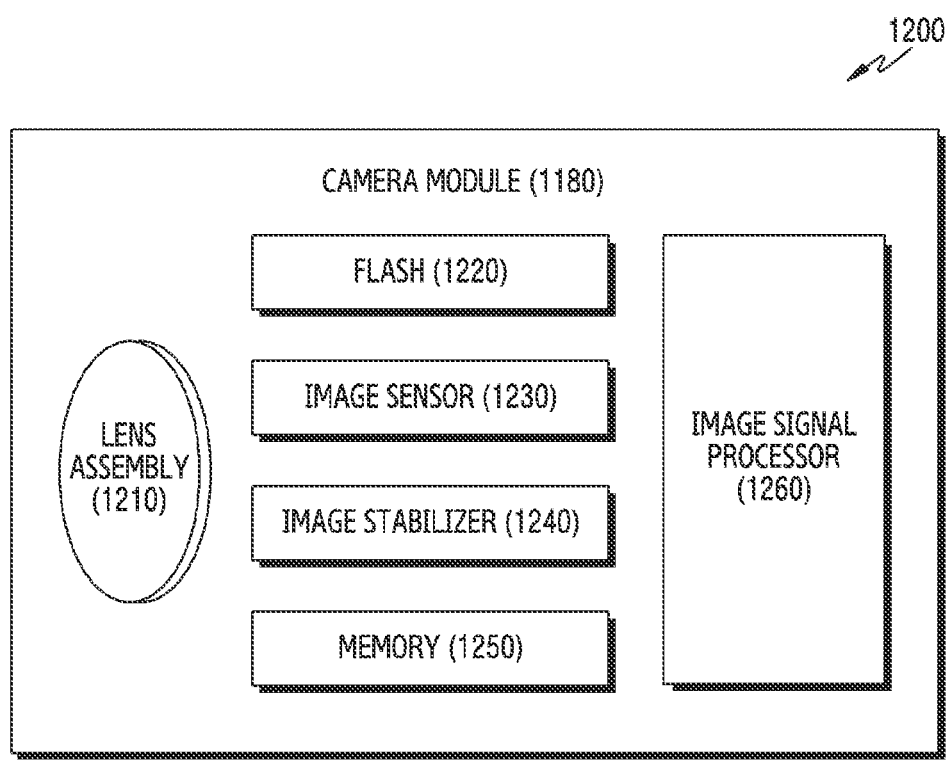
FIG. 12 is block diagram illustrating a camera module, according to an embodiment.

FIG. 12 is a block diagram illustrating the camera module, according to an embodiment. Referring to FIG. 12, the camera module 1180 may include a lens assembly 1210, a flash 1220, an image sensor 1230, an image stabilizer 1240, a memory 1250 (e.g., buffer memory), or an ISP 1260. The lens assembly 1210 may collect light emitted or reflected from an object whose image is to be taken. The lens assembly 1210 may include one or more lenses. The camera module 1180 may include a plurality of lens assemblies 1210. In such a case, the camera module 1180 may form, for example, a dual camera, a 360-degree camera, or a spherical camera. Some of the plurality of lens assemblies 1210 may have the same lens attribute (e.g., view angle, focal length, auto-focusing, f number, or optical zoom), or at least one lens assembly may have one or more lens attributes different from those of another lens assembly. The lens assembly 1210 may include, for example, a wide-angle lens or a telephoto lens.

The flash 1220 may emit light that is used to reinforce light reflected from an object. The flash 1220 may include one or more light emitting diodes (LEDs) (e.g., a GRB LED, a white LED, an IR LED, or an ultraviolet (UV) LED) or a xenon lamp. The image sensor 1230 may obtain an image corresponding to an object by converting light emitted or reflected from the object and transmitted via the lens assembly 1210 into an electrical signal. The image sensor 1230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1230 may be implemented using, for example, a charged coupled device (CCD) sensor or a CMOS sensor.

The image stabilizer 1240 may move the image sensor 1230 or at least one lens included in the lens assembly 1210 in a particular direction, or control an operational attribute (e.g., adjust the read-out timing) of the image sensor 1230 in response to the movement of the camera module 1180 or the electronic device 1101 including the camera module 1180. This allows compensating for at least part of a negative effect (e.g., image blurring) by the movement on an image being captured. The image stabilizer 1240 may sense such a movement by the camera module 1180 or the electronic device 1101 using a gyro sensor or an acceleration sensor disposed inside or outside the camera module 1180. The image stabilizer 1240 may be implemented, for example, as an optical image stabilizer.

The memory 1250 may store, at least temporarily, at least part of an image obtained via the image sensor 1230 for a subsequent image processing task. For example, if image capturing is delayed due to shutter lag or multiple images are quickly captured, a raw image obtained (e.g., a Bayer-patterned image, a high-resolution image) may be stored in the memory 1250, and its corresponding copy image (e.g., a low-resolution image) may be previewed via the display device 1160. Thereafter, if a specified condition is met (e.g., by a user's input or system command), at least part of the raw image stored in the memory 1250 may be obtained and processed, for example, by the ISP 1260. The memory 1250 may be configured as at least part of the memory 1130 or as a separate memory that is operated independently from the memory 1130.

The ISP 1260 may perform one or more image processing with respect to an image obtained via the image sensor 1230 or an image stored in the memory 1250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 1260 may perform control (e.g., exposure time control or read-out timing control) with respect to at least one (e.g., the image sensor 1230) of the components included in the camera module 1180. An image processed by the ISP 1260 may be stored back in the memory 1250 for further processing, or may be provided to an external component (e.g., the memory 1130, the display device 1160, the electronic device 1102, the electronic device 1104, or the server 1108) outside the camera module 1180. The ISP 1260 may be configured as at least part of the processor 1120, or as a separate processor that is operated independently from the processor 1120. If the ISP 1260 is configured as a separate processor from the processor 1120, at least one image processed by the ISP 1260 may be displayed, by the processor 1120, via the display device 1160 as it is or after being further processed.

The electronic device 1101 may include a plurality of camera modules 1180 having different attributes or functions. In such a case, at least one of the plurality of camera modules 1180 may form, for example, a wide-angle camera and at least another of the plurality of camera modules 1180 may form a telephoto camera. Similarly, at least one of the plurality of camera modules 1180 may form, for example, a front camera and at least another of the plurality of camera modules 1180 may form a rear camera.

As described above, an electronic device is provided that includes an image sensor having a plurality of unit pixels. Each unit pixel includes at least four PDs. The PDs are disposed adjacent to each other in a first direction and a second direction that is different from the first direction. The electronic device also includes at least one processor electrically connected to the image sensor. The at least one processor is configured to perform, in a first unit pixel among the plurality of unit pixels, a first ADC by reading out a first PD group included in the first unit pixel and a second PD group in the first unit pixel that is adjacent to the first PD group in the first direction. The at least one processor is also configured to perform a second ADC by reading out a third PD group in the first unit pixel that is adjacent to the first PD group in the first unit pixel in the second direction, and perform a third ADC by reading out a fourth PD group in the first unit pixel that is adjacent to the second PD group in the first unit pixel in the second direction. The at least one processor is further configured to detect a first phase difference in the second direction based on results of the first ADC, the second ADC, and the third ADC, and detect a second phase difference in the first direction based on results of the second ADC and the third ADC.

The at least one processor may perform an AF function, based on the first phase difference and the second phase difference.

Each of the unit pixels may include at least one color filter that is formed on at least four PDs included in the respective unit pixel, and may include at least one microlens formed on the at least one color filter.

The at least four PDs may share a same color filter and a same microlens.

Each of the unit pixels may include four PDs having a 2×2 array, and at least one FD node connected to the four PDs.

The four unit pixels may share a same color filter.

The at least one processor may analyze a frame acquired by the image sensor to compare reliability in the first direction with reliability in the second direction, and may perform the first ADC, the second ADC, and the third ADC when it is determined, based on a result of the comparison, that the reliability in the second direction is higher than the reliability in the first direction.

When it is determined, based on the result of the comparison, that the reliability in the first direction is higher, the at least one processor may perform a fourth ADC by reading out the first PD group included in the first unit pixel and the third PD group that is adjacent to the first PD group in the second direction, and may perform a fifth ADC by reading out the second PD group that is adjacent to the first PD group in the first direction. The at least one processor may also perform a sixth ADC by reading out the fourth PD group that is adjacent to the second PD group in the second direction, may detect a third phase difference in the first direction based on results of the fourth ADC, the fifth ADC, and the sixth ADC, and may detect a fourth phase difference in the second direction based on results of the fifth ADC and the sixth ADC.

The reliability in the first direction and the reliability in the second direction may be determined based on contrast in the first direction and contrast in the second direction, respectively. The at least one processor may determine that the reliability in the first direction increases as the contrast in the first direction increases, and that the reliability in the second direction increases as the contrast in the second direction increases.

In the unit pixels, the first PD group may be disposed in a first position, and the first direction may be a vertical direction downward from the first PD group.

In PDs included in a second unit pixel among the unit pixels, the at least one processor may perform a fourth ADC by reading out a first PD group of the second unit pixel and a third PD group of the second unit pixel, adjacent to the first PD group of the second unit pixel in the second direction. The at least one processor may perform a fifth ADC by reading out a second PD group of the second unit pixel, adjacent to the first PD group of the second unit pixel in the first direction, and may perform a sixth ADC by reading out a fourth PD group of the second unit pixel, adjacent to the second PD group of the second unit pixel in the second direction. The at least one processor may detect a third phase difference in the first direction based on results of the fourth ADC, the fifth ADC, and the sixth ADC, and may detect a fourth phase difference in the second direction based on results of performing the fifth ADC and the sixth ADC. The at least one processor may perform an AF function, based on the first phase difference, the second phase difference, the third phase difference, and the fourth phase difference.

The first direction may be perpendicular to the second direction.

As described above, a method is provided for operating an electronic device. In a first unit pixel among a plurality of unit pixels included in an image sensor of the electronic device, a first ADC is performed by reading out a first PD group included in the first unit pixel and a second PD group in the first unit pixel that is adjacent to the first PD group in a first direction. A second ADC is performed by reading out a third PD group in the first unit pixel that is adjacent to the first PD group in the first unit pixel in a second direction. The second direction is perpendicular to the first direction. A third ADC is performed by reading out a fourth PD group in the first unit pixel that is adjacent to the second PD group in the first unit pixel in the second direction. A first phase difference in the second direction is detected based on results of the first ADC, the second ADC, and the third ADC. A second phase difference in the first direction is detected based on results of the second ADC and the third ADC.

The method for operating the electronic device may include an operation of performing an AF function, based on the first phase difference and the second phase difference.

In the method for operating the electronic device, each of the unit pixels may include at least one color filter that is formed on at least four PDs included in the respective unit pixel, and may include at least one microlens formed on the at least one color filter.

In the method for operating the electronic device, the at least four PDs may share a same color filter and a same microlens.

In the method for operating the electronic device, each of the unit pixels may include four PDs having a 2×2 array, and at least one FD node connected to the four PDs.

In the method for operating the electronic device, the unit pixels may share a same color filter.

The method for operating the electronic device may include an operation of analyzing a frame acquired by the image sensor to compare reliability in the first direction with reliability in the second direction, and an operation of performing the first ADC, the second ADC, and the third ADC when it is determined, based on a result of the comparison, that the reliability in the second direction is higher than the reliability in the first direction.

The method for operating the electronic device may include, when it is determined, based on the result of the comparison, that the reliability in the first direction is higher than the reliability in the second direction, performing a fourth ADC by reading out the first PD group included in the first unit pixel and the third PD group that is adjacent to the first PD group in the second direction, performing a fifth ADC by reading out the second PD group that is adjacent to the first PD group in the first direction, and performing a sixth ADC by reading out the fourth PD group that is adjacent to the second PD group in the second direction. The method may further include detecting a third phase difference in the first direction based on results of the fourth ADC, the fifth ADC, and the sixth ADC, and detecting a fourth phase difference in the second direction based on results of the fifth ADC and the sixth ADC.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
   an image sensor comprising a plurality of unit pixels, wherein each unit pixel comprises at least four photodiodes (PDs), the PDs being disposed adjacent to each other in a first direction and a second direction that is different from the first direction; and
   a processor configured to:
      perform, in a first unit pixel among the plurality of unit pixels, a first analog-to-digital conversion (ADC) to obtain first ADC data by reading out a first PD group included in the first unit pixel and a second PD group in the first unit pixel that is adjacent to the first PD group in the first direction;
      perform a second ADC to obtain second ADC data by reading out a third PD group in the first unit pixel that is adjacent to the first PD group in the second direction;
      perform a third ADC to obtain third ADC data by reading out a fourth PD group in the first unit pixel that is adjacent to the second PD group in the first unit pixel in the second direction;
      detect a first phase difference in the second direction by using the first ADC data, the second ADC data and the third ADC data; and
      detect a second phase difference in the first direction by using the second ADC data obtained from the third PD group and the third ADC data obtained from the fourth PD group, without using the first ADC data obtained from the first PD group and the second PD group.

2. The electronic device of claim 1, wherein the processor is configured to perform an auto focus function, based on the first phase difference and the second phase difference.

3. The electronic device of claim 1, wherein each of the plurality of unit pixels comprises at least one color filter that is formed on at least four PDs included in the respective unit pixel, and comprises at least one microlens formed on the at least one color filter.

4. The electronic device of claim 3, wherein the at least four PDs are configured to share a same color filter and a same microlens.

5. The electronic device of claim 1, wherein each of the plurality of unit pixels comprises four PDs having a 2×2 array, and at least one floating diffusion (FD) node connected to the four PDs.

6. The electronic device of claim 5, wherein the plurality of unit pixels are configured to share a same color filter.

7. The electronic device of claim 1, wherein the processor is further configured to:
   analyze a frame acquired by the image sensor to compare reliability in the first direction with reliability in the second direction; and
   perform the first ADC, the second ADC, and the third ADC when it is determined, based on a result of the comparison, that the reliability in the second direction is higher than the reliability in the first direction.

8. The electronic device of claim 7, wherein the processor is further configured to:
   when it is determined, based on the result of the comparison, that the reliability in the first direction is higher than the reliability in the second direction:
   perform a fourth ADC by reading out the first PD group included in the first unit pixel and the third PD group that is adjacent to the first PD group in the second direction;
   perform a fifth ADC by reading out the second PD group that is adjacent to the first PD group in the first direction;
   perform a sixth ADC by reading out the fourth PD group that is adjacent to the second PD group in the second direction;
   detect a third phase difference in the first direction, based on results of the fourth ADC, the fifth ADC, and the sixth ADC; and
   detect a fourth phase difference in the second direction, based on results of the fifth ADC and the sixth ADC.

9. The electronic device of claim 7, wherein:
   the reliability in the first direction and the reliability in the second direction are determined based on contrast in the first direction and contrast in the second direction, respectively; and
   the processor is further configured to determine that the reliability in the first direction increases as the contrast in the first direction increases, and that the reliability in the second direction increases as the contrast in the second direction increases.

10. The electronic device of claim 1, wherein, in the plurality of unit pixels, the first PD group is disposed in a first position, and the first direction is a vertical direction downward from the first PD group.

11. The electronic device of claim 1, wherein, in PDs included in a second unit pixel among the plurality of unit pixels, the processor is further configured to:
perform a fourth ADC by reading out a first PD group of the second unit pixel and a third PD group of the second unit pixel, adjacent to the first PD group of the second unit pixel in the second direction;
perform a fifth ADC by reading out a second PD group of the second unit pixel, adjacent to the first PD group of the second unit pixel in the first direction;
perform a sixth ADC by reading out a fourth PD group of the second unit pixel, adjacent to the second PD group of the second unit pixel in the second direction;
detect a third phase difference in the first direction, based on results of the fourth ADC, the fifth ADC, and the sixth ADC;
detect a fourth phase difference in the second direction, based on results of the fifth ADC and the sixth ADC; and
perform an auto focus function, based on the first phase difference, the second phase difference, the third phase difference, and the fourth phase difference.

12. The electronic device of claim 1, wherein the first direction is perpendicular to the second direction.

13. A method for operating an electronic device, comprising:
performing, in a first unit pixel among a plurality of unit pixels included in an image sensor of the electronic device, a first analog-to-digital conversion (ADC) to obtain first ADC data by reading out a first PD group included in the first unit pixel and a second PD group in the first unit pixel that is adjacent to the first PD group in a first direction;
performing a second ADC to obtain second ADC data by reading out a third PD group in the first unit pixel that is adjacent to the first PD group in a second direction, the second direction being perpendicular to the first direction;
performing a third ADC to obtain third ADC data by reading out a fourth PD group in the first unit pixel that is adjacent to the second PD group in the second direction;
detecting a first phase difference in the second direction by using the first ADC data, the second ADC data and the third ADC data; and
detecting a second phase difference in the first direction by using the second ADC data obtained from the third PD group and the third ADC data obtained from the fourth PD group, without using the first ADC data obtained from the first PD group and the second PD group.

14. The method of claim 13, further comprising performing an auto focus function, based on the first phase difference and the second phase difference.

15. The method of claim 13, wherein each of the plurality of unit pixels comprises at least one color filter that is formed on at least four PDs included in the respective unit pixel, and comprises at least one microlens formed on the at least one color filter.

16. The method of claim 15, wherein the at least four PDs are configured to share a same color filter and a same microlens.

17. The method of claim 13, wherein each of the plurality of unit pixels comprises four PDs having a 2×2 array, and at least one floating diffusion (FD) node connected to the four PDs.

18. The method of claim 17, wherein the plurality of unit pixels are configured to share a same color filter.

19. The method of claim 13, further comprising:
analyzing a frame acquired by the image sensor to compare reliability in the first direction with reliability in the second direction; and
performing the first ADC, the second ADC, and the third ADC when it is determined, based on a result of the comparison, that the reliability in the second direction is higher than the reliability in the first direction.

20. The method of claim 19, further comprising:
analyzing the frame acquired by the image sensor to compare the reliability in the first direction with the reliability in the second direction, and
when it is determined, based on the result of the comparison, that the reliability in the first direction is higher than the reliability in the second direction:
performing a fourth ADC by reading out the first PD group included in the first unit pixel and the third PD group that is adjacent to the first PD group in the second direction;
performing a fifth ADC by reading out the second PD group that is adjacent to the first PD group in the first direction;
performing a sixth ADC by reading out the fourth PD group that is adjacent to the second PD group in the second direction;
detecting a third phase difference in the first direction, based on results of the fourth ADC, the fifth ADC, and the sixth ADC; and
detecting a fourth phase difference in the second direction, based on results of the fifth ADC and the sixth ADC.

* * * * *